United States Patent
Biehl et al.

[11] Patent Number: 6,081,560
[45] Date of Patent: Jun. 27, 2000

[54] PRODUCTION OF A FREQUENCY CONTROL SIGNAL IN AN FSK RECEIVER

[75] Inventors: Manfred Biehl, Norderstedt; Winfried Jansen, Quickborn; Ralf Pilaski, Hamburg, all of Germany

[73] Assignee: U.S. Philips Corporation, New York, N.Y.

[21] Appl. No.: 08/945,624

[22] PCT Filed: Feb. 27, 1997

[86] PCT No.: PCT/IB97/00181

§ 371 Date: Oct. 29, 1997

§ 102(e) Date: Oct. 29, 1997

[87] PCT Pub. No.: WO97/32422

PCT Pub. Date: Sep. 4, 1994

[30] Foreign Application Priority Data

Mar. 2, 1996 [DE] Germany .......................... 196 08 068

[51] Int. Cl.⁷ .............................. H03D 3/00; H04L 27/14
[52] U.S. Cl. .......................... 375/334; 375/344; 329/300; 455/192.2
[58] Field of Search .................................. 375/316, 334, 375/324, 344, 346; 455/130, 192.1, 192.2; 329/300–303

[56] References Cited

U.S. PATENT DOCUMENTS

| | | | |
|---|---|---|---|
| 4,550,292 | 10/1985 | Smith | 331/2 |
| 4,672,636 | 6/1987 | Marshall et al. | 375/88 |
| 5,515,197 | 5/1996 | Hooijmans et al. | 359/189 |
| 5,548,619 | 8/1996 | Horiike et al. | 375/344 |
| 5,790,607 | 8/1998 | Burke et al. | 375/355 |
| 5,818,302 | 10/1998 | Otsuka et al. | 331/17 |

FOREIGN PATENT DOCUMENTS

| | | | |
|---|---|---|---|
| 0141466A2 | 5/1985 | European Pat. Off. | H04L 27/16 |
| 0160339A2 | 11/1985 | European Pat. Off. | H04L 27/14 |
| 2308245 | 11/1976 | France | H03D 3/06 |
| 2508540A1 | 9/1976 | Germany | H04L 27/22 |
| 2942512A1 | 5/1980 | Germany | H04L 27/14 |

OTHER PUBLICATIONS

"Zwei Ics fur einen Pager", by Von Stefan Drude, Funkschau, Hft 26, 1989, pp. 69–76.

Primary Examiner—Chi H. Pham
Assistant Examiner—Bryan Webster
Attorney, Agent, or Firm—Jack D. Slobod

[57] ABSTRACT

Circuit arrangement for generating a control signal. A circuit arrangement for generating a control signal for a controllable oscillator of a receiving device, is arranged to mix an FSK modulated input signal, having at least two predetermined input frequencies, with an oscillation, output by a controllable oscillator, so as to form an intermediate frequency signal, as well as to derive from the intermediate frequency signal a data signal whose instantaneous value is determined by the frequency of the intermediate frequency signal (intermediate frequency) and also a demodulator pulse signal whose frequency and/or phase is a measure of the frequency and/or phase of the intermediate frequency signal, from the intermediate frequency signal. The circuit arrangement includes a control signal generating branch for deriving the control signal from the demodulator pulse signal, an interrupt signal generating branch for deriving an interrupt signal from the data signal during the time intervals in which the data signal changes its value, and also an interrupt stage which suppresses the extraction of a value for the control signal from the demodulator pulse signal in response to the appearance of the interrupt signal. The described circuit arrangement precludes falsifications of the control signal during the time intervals in which the data signal changes its value.

10 Claims, 4 Drawing Sheets

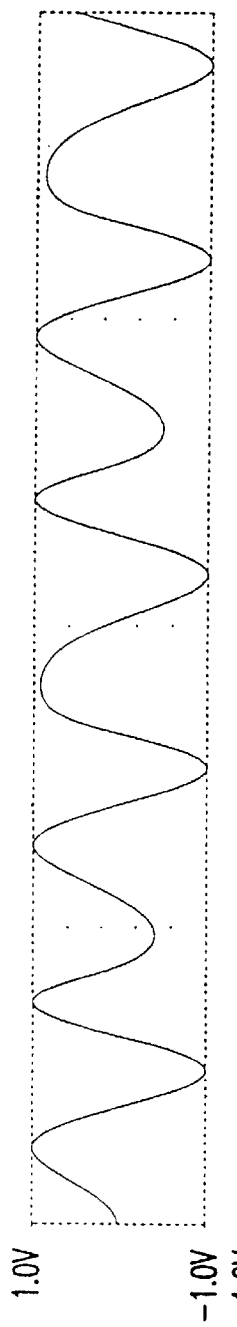
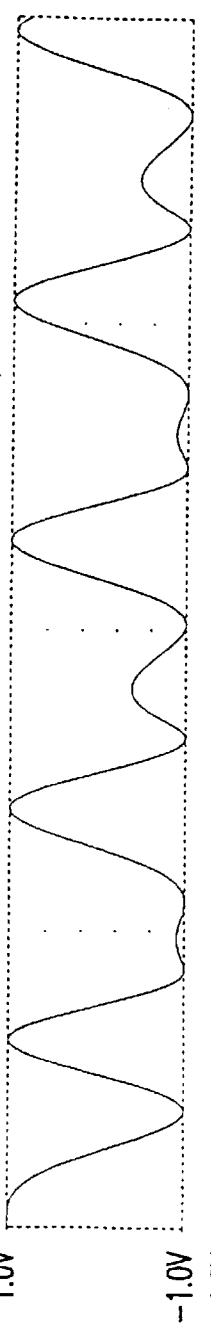
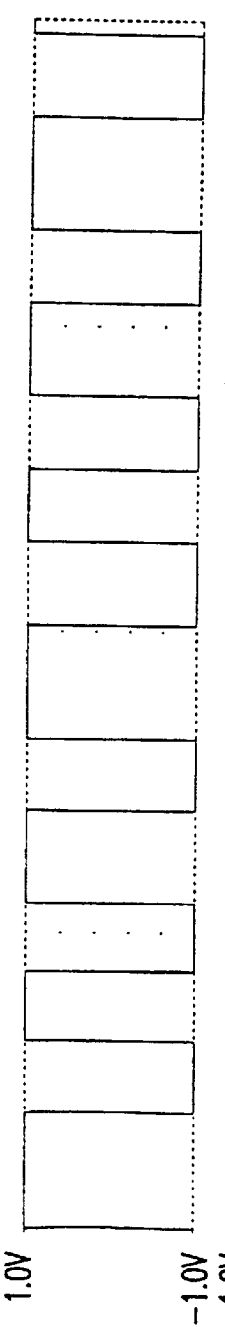
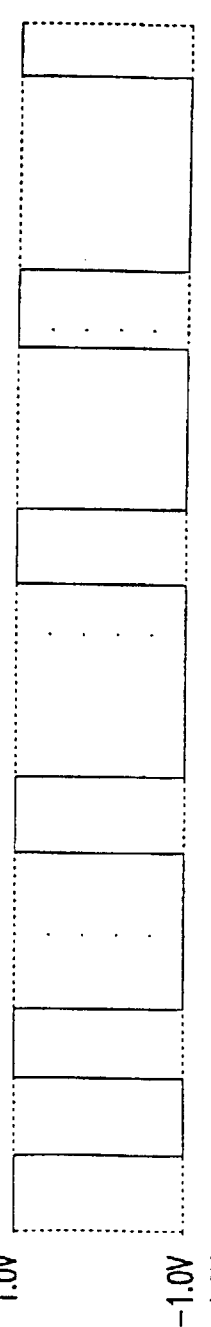
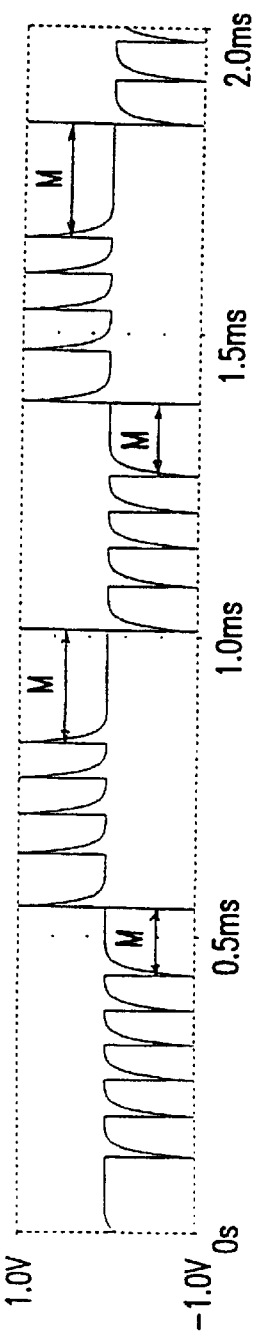

PRODUCTION OF A FREQUENCY CONTROL SIGNAL IN AN FSK RECEIVER

BACKGROUND OF THE INVENTION

The invention relates to a circuit arrangement for generating a control signal, and to a radio receiver including such a circuit arrangement.

EP-A 0 160 390, which corresponds to U.S. Pat. No. 4,672,636, discloses a circuit arrangement for an FM receiver which is arranged to receive directly modulated data signals. This circuit arrangement includes a local oscillator whose frequency lies on the frequency scale between two signal frequencies. The known circuit arrangement is arranged notably for the reception and demodulation of FSK modulated signals as used in digital radio receivers (pagers).

The circuit arrangement known from EP-A 0 160 339 includes a mixer in which signals originating from an antenna are mixed with the signal from a local oscillator. A channel filter which succeeds the mixer and is constructed as a low-pass or bandpass filter filters the output signal of the mixer and applies it to a stage whose transfer function has the characteristic of a frequency discriminator. The output signal thereof is applied, via an amplifier and a low-pass filter, as a control signal to the local oscillator in order to readjust the frequency thereof. The article "Zwei ICs für einen Pager" by Stephan Drude, Funkschau, Heft 26, 1989, pp. 69 to 76, describes a receiver component, having the type number UAA2050T, for a pager operating with direct frequency shift keying, i.e. with FSK modulation. A pager constructed by means of such a receiver component includes automatic frequency control (AFC) for the compensation of temperature fluctuations and ageing effects.

DE-A-29 42 512 describes a radio receiver for receiving FSK modulated radio signals via an antenna. The radio signals contain two receiving frequencies which are situated a distance equal to the frequency deviation of the FSK modulation above and below the frequency of an RF carrier. These radio signals are applied to two high-gain mixers. A mixing oscillator oscillates at the frequency of the RF carrier. Its signal is applied to the first high-gain mixer directly and to the second high-gain mixer via a 90° phase shifter. The outputs of the mixers are connected to a respective low-pass filter. The filtered signals then reach a respective high-gain limiter amplifier. The outputs of the limiter amplifiers supply square-wave signals. The signal at the output of one of the limiter amplifiers leads or lags the signal at the output of the other limiter amplifier, depending on whether the frequency of the input signal at the antenna is lower or higher than that of the mixer oscillator. These two feasible states are recognized by a D-flipflop which is switched to one of its two feasible states in dependence thereon.

The frequency of an ideal receiving signal for such a radio receiver, for example a pager, changes abruptly between the two feasible values, i.e. the two feasible frequencies of the radio signals received which are also referred to as transmitter signal "1" or "0" in the radio signal data code. In reality, however, such an ideal signal is not present; to the contrary, the transmitter signal requires a finite period of time for changing over from one frequency to the other. Analogously, a finite period of time elapses during the switching over from one state to the other in the demodulated signal. It appears that valid frequency measurement is not possible during this period of time. During this period of time, referred to as a transitional interval, not only the assignment of the transmitted radio signals to one of the data values "1" or "0" is impeded, but notably also the generating of the control signal for the controllable oscillator. This is because this control signal must correspond to the frequency deviation of the FSK modulation in order to achieve correct control of the oscillator frequency. During the transitional interval, i.e. during the period of time in which the data signal derived from the received signal changes its value, however, a control signal is generated which no longer corresponds to the frequency deviation of the FSK modulation, but notably to a smaller frequency difference. This results in undue readjustment of the frequency of the oscillator during the transitional intervals.

The associated error occurs notably in the case of high information transmission rates in the receiving signal with the resultant very short information units (bits). This is because the transitional intervals then take up a substantial part of the overall duration of the individual bits. This increases the risk of the oscillator frequency control being disturbed by the generating of an erroneous control signal. Errors then occur increasingly in the data reception of the radio receiver; these errors must be avoided so as to ensure that a required low bit error rate of the radio receiver (for example, a pager) is not exceeded.

Because of the receiving frequencies of contemporary radio receivers (pagers), amounting to, for example approximately 930 MHz, very severe requirements are also imposed in respect of the short-term and the long-term stability of the frequency of the oscillator of the receiving device. If the oscillator cannot satisfy these requirements, the sensitivity will inevitably be affected and in some cases reception will even break down.

OBJECTS AND SUMMARY OF THE INVENTION

It is an object of the invention to provide a circuit arrangement for generating a control signal for a controllable oscillator of a receiving device of the kind set forth in which the control signal is not affected by said disturbances in the transitional interval.

According to the invention, this object is achieved by means of a circuit arrangement for generating a control signal for a controllable oscillator of a receiving device, said circuit arrangement being arranged to mix an FSK modulated input signal having at least two predetermined input frequencies with an oscillation supplied by the controllable oscillator, thus forming an intermediate frequency signal, as well as to derive from the intermediate frequency signal a data signal whose instantaneous value follows from the frequency of the intermediate frequency signal (intermediate frequency), and to derive also a demodulator pulse signal whose frequency and/or phase is a measure of the frequency and/or phase of the intermediate frequency signal, said circuit arrangement including a control signal generating branch for deriving the control signal from the demodulator pulse signal, an interrupt signal generating branch for deriving an interrupt signal from the data signal during the time intervals in which the data signal changes its value, as well as an interrupt stage which suppresses the extraction of a value for the control signal from the demodulator pulse signal in response to the appearance of the interrupt signal.

Thus, during the transitional interval the circuit arrangement according to the invention suppresses the receiving signal for the frequency measurement, i.e. for the generating of the control signal for the controllable oscillator. The transitional intervals are thus effectively eliminated as sources of errors for the generating of the control signal.

In an attractive embodiment of the circuit arrangement according to the invention, the control signal is formed by temporal averaging of a sequence of control signal values discontinuously derived from the demodulator pulse signal, control signal values stemming from the transitional interval being excluded from the averaging operation. Dual error protection is thus achieved: on the one hand, the discontinuous extraction reduces the effect of disturbances on the control signal values and, on the other hand, the control signal values generated during the transitional intervals are also rejected. This can be achieved by means of a very simple circuit arrangement.

In a preferred embodiment of the invention, the demodulator pulse signal contains a sequence of pulses whose repetition frequency is an integer multiple of the intermediate frequency. The control signal values are then formed by measurement of the temporal spacing of successive pulses. This measurement can be performed notably in an integration stage in which a signal of constant level is integrated in the time interval between every two successive pulses of the demodulator pulse signal. The integrated value of the signal of constant level at the end of the relevant time interval then represents the instantaneous control signal value.

The interrupt signal generating branch in a preferred embodiment of the invention includes a signal transition detection stage and a pulse-forming stage which is coupled thereto. The signal transition detection stage serves to detect the transitions of the value of the data signal and preferably includes a differentiating stage. Such a stage supplies an output signal whenever the instantaneous value of an input signal applied thereto changes in time. The pulse-forming stage serves to form a pulse-shaped interrupt signal having a duration equal to the transitional interval. This interrupt signal can be used directly for eliminating the undesirable, error-containing demodulated receiving signals in the circuit arrangement according to the invention.

The signal transition detection stage advantageously includes a rectifier stage which succeeds the differentiating stage. This rectifier stage serves to form the absolute value of the signal output by the differentiating stage, i.e. to remove the sign, because for the recognition of a transitional interval it is merely necessary to recognize a transition of the value of the data signal, but not the direction thereof.

BRIEF DESCRIPTION OF THE DRAWINGS

An embodiment of the circuit arrangement according to the invention is shown in the drawing and will be described in detail hereinafter.

FIG. 4 shows examples of experimentally determined temporal variations in a receiving device employing the circuit arrangement according to the invention.

DETAILED DESCRIPTION OF THE PREFERRED EMBODIMENT

Figure 1:
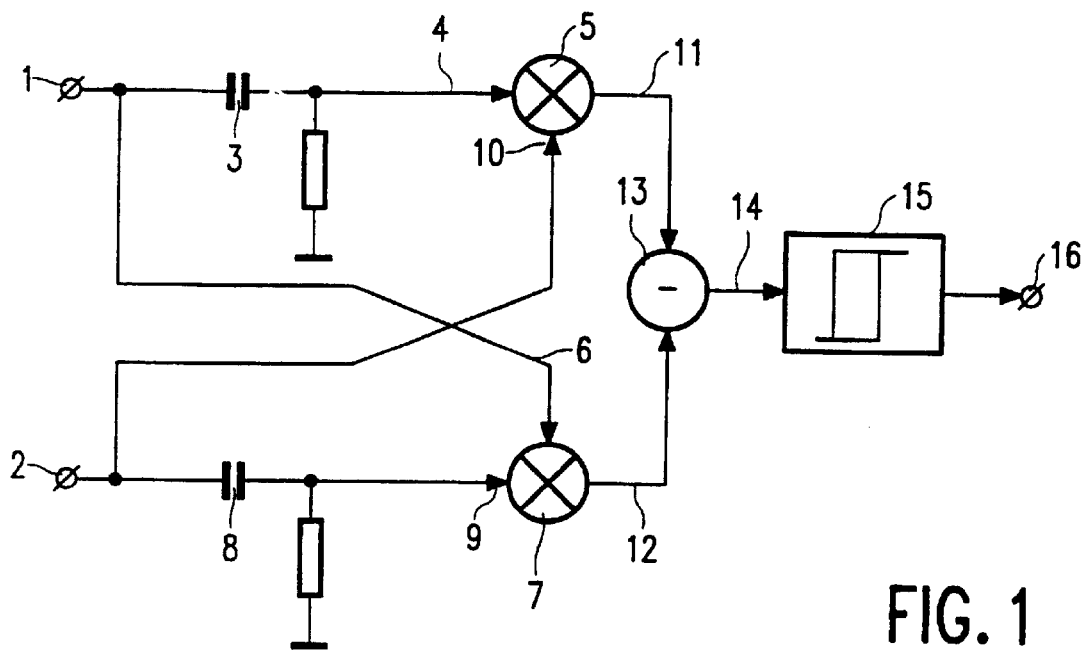
FIG. 1 shows a block diagram of an arrangement for deriving a demodulator pulse signal and a data signal from an intermediate frequency signal, which arrangement can be used, together with the circuit arrangement according to the invention, for generating a control signal for a controllable oscillator.
Figure 2A:
FIG. 2 shows the variations in time of signals occurring during operation of the arrangement shown in FIG. 1.
Figure 2B:
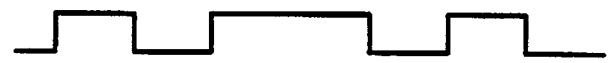
Figure 2C:
Figure 2D:
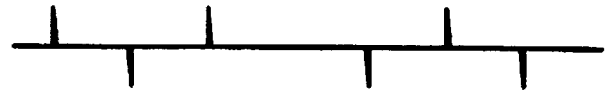
Figure 2E:
Figure 2F:
Figure 2G:
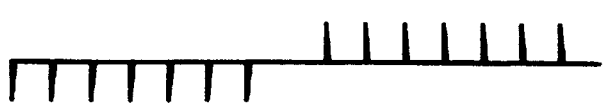
Figure 2H:
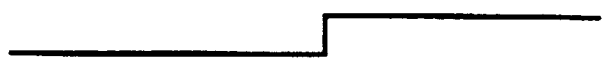

In a receiving device for an FSK modulated input signal the arrangement shown in FIG. 1 forms a decoding stage whereby a data signal and a demodulator pulse signal can be derived from an intermediate frequency signal. To this end, two input terminals 1, 2 of the decoding stage shown in FIG. 1 are connected to output terminals of a quadrature demodulator which produces two 90° phase-shifted squarewave oscillations by mixing the FSK modulated input signal with the oscillation from the controllable oscillator. A quadrature demodulator of this kind is formed, for example by the circuit arrangement which is known from DE-A 29 42 512. At the outputs BA of the limiter amplifier it also supplies seven squarewave oscillations which pair-wise lead and lag one another by 90° and form the intermediate frequency signal. The output B of the limiter amplifier 8 of FIG. 1 of DE-A 29 42 512 is to be connected to the first input terminal 1 of the decoding stage shown in FIG. 1 of the present embodiment. Analogously, the output A of the prior art limiter amplifier 7 is connected to the second input terminal 2 of the decoding stage shown in the present FIG. 1. By way of example, FIG. 2a shows a squarewave oscillation applied to the first input terminal 1 and FIG. 2 b) shows a squarewave oscillation applied to the second input terminal 2.

The first input terminal 1 of the decoding stage of FIG. 1 is connected to a first input 4 of a first mixer 5 via a first RC high-pass filter 3 and directly to a second input 6 of a second mixer 7. Analogously, the second input terminal 2 is connected to a first input 9 of the second mixer 7 via a second RC high-pass filter 8 and directly to a second input 10 of the first mixer 5. The outputs 11 and 12 of the mixers 5 and 7, respectively, are connected to a respective input of a subtraction stage 13. In the subtraction stage 13 the signal from the output 12 of the second mixer 7 is subtracted from the signal at the output 11 of the first mixer 5. The signal resulting from this subtraction operation appears as a demodulator pulse signal at the output 14 of the subtraction stage 13. The data signal is derived therefrom via a trigger circuit 15 behaving as a Schmitt trigger, said data signal being output via the output 16 of the trigger circuit 15.

The signal waveforms shown in FIG. 2 represent the events in the case of an ideal receiving signal for a pager; these events relate to a period of time in which the signal frequency abruptly changes between two values. At the instant of this change of frequency the phase position between the square-wave signals at the input terminals 1 and 2 of the decoding stage of FIG. 1 also changes. This is due to a phase jump in the signal at the second input terminal 2 in conformity with FIG. 2 b).

The RC high-pass filters 3, 8, operating as differentiating members, supply the first inputs 4 and 9 of the mixers 5 and 7, respectively, with brief pulses (needle pulses) in response to each edge of the signals at the input terminals 1 and 2, respectively, the polarity of said pulses changing in dependence on whether a positive-going or a negative-going edge is concerned. These needle pulses are shown in FIG. 2 c) for the first input 4 of the first mixer 5 and in FIG. 2 d) for the first input 9 of the second mixer 7. Their phase position follows the phase position of the signals at the input terminals 1, 2. Subsequently, in the first mixer 5 the series of needle pulses at the first input 4 is multiplied by the signal from the second input terminal 2 which is applied to the second input 10 of the first mixer 5. Analogously, in the second mixer 7 the needle pulse sequence at the first input 9 of the second mixer 7 is multiplied by the signal from the first input terminal 1 which is applied to the second input 6 of the second mixer 7. The needle pulse sequence shown in FIG. 2 e), continuously having a corresponding polarity for a respective phase position between the signals at the input terminals 1, 2, then appears at the output 11 of the first mixer 5. A correspondingly formed needle pulse sequence as shown in FIG. 2 f) appears at the output 12 of the second mixer 7. Subtraction of the needle pulse sequence of FIG. 2 f) from that of FIG. 2 e) in the subtraction stage 13 produces the needle pulse sequence shown in FIG. 2 e) at the output 14 of this stage. This sequence comprises a needle pulse for each edge in the signals at the input terminals 1, 2; the polarity of the needle pulses changes as the phase positions between the signals at the input terminals 1, 2 change. The trigger circuit 15, behaving as a Schmitt trigger, forms the signal shown in FIG. 2 *h*) from the signal shown in FIG. 2 *g*). Therein, each signal level represents one value of the frequencies of the input signal.

Hereinafter, the signal shown in FIG. 2 *g*) will be referred to as the demodulator pulse signal and that shown in FIG. 2 *h*) as the data signal.

FIG. 2 shows an embodiment of a circuit arrangement according to the invention for generating a control signal for a controllable oscillator of a radio receiver as proposed and described above. For the sake of simplicity, this embodiment is again designed for so-called two-level FSK modulation, like the circuit arrangement shown in FIG. 1, the receiving signal being switched between two different frequencies. However, the invention is not restricted to such a two-level FSK signal but can also be used for multi-level FSK modulation.

The described circuit arrangement is preferably used for automatic frequency control (AFC) in a radio receiver; it controls the frequency of the controllable oscillator in the receiving device to the mean value of the two input frequencies predetermined by the FSK modulation. This is at the same time the carrier frequency of the FSK modulated transmitter signal.

In the case of automatic frequency control of the kind set forth, as described in detail in the cited publication in "Funkschau", the intermediate frequencies are used as information for the frequency spacing between the frequency of the oscillator and the input frequencies. The intermediate frequencies, however, are also subject to the effects of the modulation. In the frequency control systems known from the cited literature, this may lead to false information in respect of the necessary readjustment of the frequency of the oscillator. The circumstances in which the false information occurs are dependent on the data rate used in the input signal, on the phase position between data transitions, and on the intermediate frequencies. The so-called splatter filters provided in the transmitter, serving for band limitation of the signal transmitted and hence received, also have an effect. One of the most essential properties of the splatter filter in this respect is the fact that the frequency of the signal no longer abruptly changes after processing by the splatter filter. The splatter filter thus contributes to the prolongation of the transitional intervals and hence possibly to the disturbances as described above.

Because of the multitude of different effects, the measurement errors containing the false information in respect of the necessary correction of the frequency of the controllable oscillator are of a rather random nature and their consequences are difficult to predict since the occurrence of errors regarding the direction of the necessary correction of the frequency of the oscillator cannot be precluded either. Errors in respect of the direction of the frequency correction, however, can readily cause the frequency of the oscillator to leave the frequency range between the input frequencies. Such a shift of the frequency of the oscillator, however, usually leads to complete destruction of the data received and should, therefore, be prevented at all cost.

It is to be noted that in a radio receiver (pager) a bit error rate of, for example, 3% should not be exceeded.

In the circuit arrangement according to the invention the transitional interval in which the data transition, i.e. the transition of the input frequency, takes place is detected. All measurement information formed during these transitional intervals is rejected. The information from the intermediate frequencies is used only when the input frequency has become steady for one of the data values.

Figure 3:
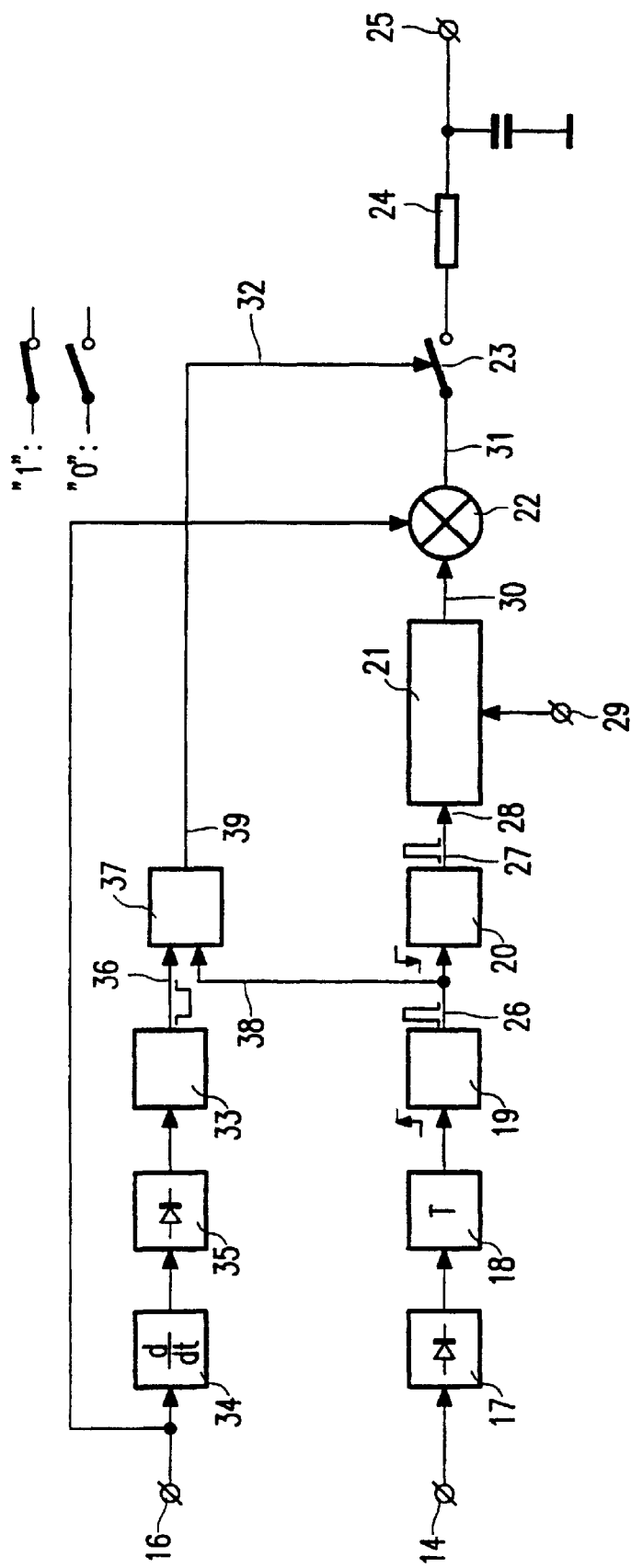
FIG. 3 shows a block diagram of an embodiment of the circuit arrangement according to the invention.

The circuit arrangement shown in FIG. 3 includes a control signal generating branch with a concentration of a rectifier stage 17, a delay member 18, a first pulse-shaping stage 19, a second pulse-shaping stage 20, an integration stage 21, a mixer 22, a keying stage 23, shown as a switch, and an RC low-pass filter 24. The input of the rectifier stage 17 is connected to the output 14 of the subtraction stage 13 of FIG. 1 and receives the demodulator pulse signal. This signal is rectified in the rectifier stage 17, i.e. all needle pulses of the signal waveform of FIG. 2 *g*) are given a uniform polarity which is independent of the instantaneous value of the data signal of FIG. 2 *h*). This is the positive polarity in the example shown. The rectifier stage 17 thus "removes" the sign from the signal shown in FIG. 2 *g*); it forms the absolute value of the demodulator pulse signal. This absolute value signal drives the input of the first pulse-shaping stage 19 via the delay member 18. The first pulse-shaping stage 19 includes a monostable trigger circuit whose output 26 supplies a square-wave pulse of predetermined duration in response to each positive-going edge of the absolute value signal from the rectifier stage 17 or the delay member 18. The trailing edge thereof initiates a second square-wave pulse at the output 27 of the second pulse-shaping stage 20, said second square-wave pulse temporally succeeding the first squarewave pulse at the output 26 of the first pulse-shaping stage 19. The second square-wave pulse is applied from the output 27 of the second pulse-shaping stage 20 to a reset input 28 of the integration stage 21. Via a reference value input 29, the integration stage 21 also receives a signal of constant level. This signal is continuously integrated in the integration stage 21 and the integral thus formed is output as a signal value (or level) via the output 30 of the integration stage 21. The signal value at the output 30 is reset to an initial value in response to each square-wave pulse reaching the reset input 28 of the integration stage 21, and the signal value subsequently starts to increase anew from said initial value. The signal value at the output 30 is, therefore, a direct measure of the period of time elapsed since the arrival of the last square-wave pulse at the reset input 28. Thus, immediately before the arrival of the next square-wave pulse at the reset input 28 the signal value at the output 30 is a measure of the temporal distance between two needle pulses of the demodulator pulse signal. The signal value at the output 30 thus represents the frequency of the intermediate frequency signal. It changes together with the frequency of the controllable oscillator and can, therefore, be used as a control signal for controlling the frequency of this oscillator. To this end, in the mixer 22 it is first mixed with the data signal from the output 16 of the trigger stage 15, the output 16 as well as the output 30 of the integration stage 21 being connected to a respective input of the mixer 22 for this purpose. Because of the mixing of the signal value from the output 30 of the integration stage 21 with the data signal from the output 16 of the trigger stage 15, the signal value from the output 30 is given a polarity in conformity with the value of the data signal received, said polarity determining the sense of the control or the correction of the frequency of the oscillator.

The keying stage 23 includes a control input 32 which must receive a signal having a high logic level ("1") when the keying stage 23 must establish a conductive connection between the output 31 of the mixer 22 and the RC low-pass filter 24. To this end, the output 26 of the first pulse-shaping stage 19 in FIG. 3 is connected to the control input 32; the first square-wave pulse thus establishes this connection. The RC low-pass filter 24 thus receives, directly before the resetting of the integration stage 21 via the second square-wave pulse at the reset input 28, the instantaneous signal value from the output 30, mixed with the data signal (via the mixer 22), in the form of a sampling value. In other words, the RC low-pass filter 24 successively receives, via the keying stage 23, the measuring values for the period of time between each time two pulses of the demodulator pulse signal, i.e. discontinuous frequency measuring values of the intermediate frequency signal. These measuring values are low-pass filtered in the RC low-pass filter 24 and made available as the control signal for the oscillator at the output 25 of the RC low-pass filter 24. The operation of this circuit corresponds to weighted sampling.

FIG. 3 also shows an interrupt signal generating branch which succeeds the output 16 of the trigger stage 15 and comprises a signal transition detection stage as well as a (third) pulse-shaping stage 33 which is coupled thereto. The signal transition detection stage includes a differentiating stage 34 and a downstream (second) rectifier stage 35. The pulse-shaping stage 33, the differentiating stage 34 and the rectifier stage 35 are connected as a network to the output 16 of the trigger stage 15.

The differentiating stage 34 serves to recognize signal value transitions in the data signal. The polarity of its output signal follows the direction of the signal value transition of the data signal. Because it is not important for the present purpose, a pulse sequence of constant polarity is generated therefrom in the rectifier stage 35, i.e. the sign is again eliminated. In the pulse-shaping stage 33 each of the pulses received from the rectifier stage 35 generates a pulse of predetermined duration which has a negative polarity (or a low signal level) in the present example. This pulse serves as an interrupt signal and is applied from the pulse-shaping stage 33 to a first input 36 of an interrupt stage 37. This interrupt stage is preferably constructed as an AND-gate, its second input 38 being connected to the output 26 of the first pulse-shaping stage 19. An output 39 of the interrupt stage 37 is connected to the control input 32 of the keying stage 23.

When the data signal at the output 16 of the trigger stage 15 has a constant value, a logic level "1" is continuously present at the first input 36 of the interrupt stage 37. Therefore, the interrupt stage 37 is continuously conductive for the first square-wave pulse from the output 26 of the first pulse-shaping stage 19. Measuring values for generating the control signal at the output 25 of the RC low-pass filter 24 can thus be derived, via the integration stage 21 and the keying stage 23, for each needle pulse of the demodulator pulse signal. When an interrupt signal occurs, i.e. in the transitional intervals in which the data signal changes its value, a low signal level (logic value "0") appears at the first input 36 of the interrupt stage 37. The transfer of the first square-wave pulse from the first pulse-shaping stage 19 to the keying stage 23 is thus interrupted. Therefore, no measuring values are applied to the RC low-pass filter 24 during the transitional intervals, so that the value of the control signal stored thereby cannot be influenced during the transitional intervals, and hence cannot be falsified either.

The delay member 18 then provides a temporal delay of the signals in the control signal generating branch, thus ensuring that the interrupt signal is applied to the interrupt stage 37 at the appropriate time, i.e. before the appearance of the first square-wave pulse from the first pulse-shaping stage 19 in the transitional interval. The length of the pulse-shaped interrupt signal, preferably determined by a monostable trigger stage in the (third) pulse-shaping stage 33, is such that the transitional intervals are masked in conformity with the signals received.

The integration stage 21 may be constructed in such a manner that the signal value at its output 30 persists for a predetermined final value if the distance in time between two successive needle pulses in the demodulator pulse signal becomes too large. The signal levels can be adjusted in such a manner that the signal value at the output 30 of the integration stage 21 assumes exactly a mean value between its initial value and said final value when the frequency of the oscillator is correctly adjusted to the carrier frequency of the signals received. The frequency of the oscillator will not be corrected in that case.

The described circuit arrangement offers the advantage that the absolute value of the control signal for the controllable oscillator of the receiving device is reduced in the case of a reduction of the signal-to-noise ratio and other receiving conditions causing random errors in the data signal. The generating of incorrect control signals is thus also prevented in these operating conditions. The circuit arrangement shown, moreover, utilizes limitation of the control signal and proportional control. It is thus ensured that in no circumstances the automatic frequency control will drive the oscillator to a frequency range beyond the input frequencies received, i.e. beyond the frequency keying received. The frequency tolerance of the non-controlled oscillator, determined by manufacturing parameters and temperature effects, must then be chosen to be so small that the distance between the frequency of the oscillator and the input frequencies never becomes less than a value corresponding to the control range of the automatic frequency control. Overall, the requirements imposed on the oscillator by the circuit arrangement in accordance with the invention are less severe in comparison with the state of the art, so that the manufacture can be less expensive.

The invention reduces spurious effects on the control of the oscillator by operating conditions which are known to those skilled in the art as "fading", "multipath", "simulcost", "neighboring channel effects", "blocking" etc. by limitation of the control signal.

FIG. 4 shows some signal waveforms measured in a receiving device constructed by means of the circuit arrangement according to the invention. FIGS. 4 a) and b) show two quadrature-demodulated oscillations of the intermediate frequency signal whose phases alternately lead and lag in conformity with the modulation with a data signal to be recovered. In the FIGS. 4 c) and d) the signals of the FIGS. 4 a) and b), respectively, have been converted into square-wave signals, for example by high-gain limiting amplifiers. FIG. 4 e) shows a demodulator pulse signal derived therefrom and corresponding to the waveform of FIG. 2 g). Therein, the measuring intervals rejected according to the invention are denoted by the reference M.

Figure 5:
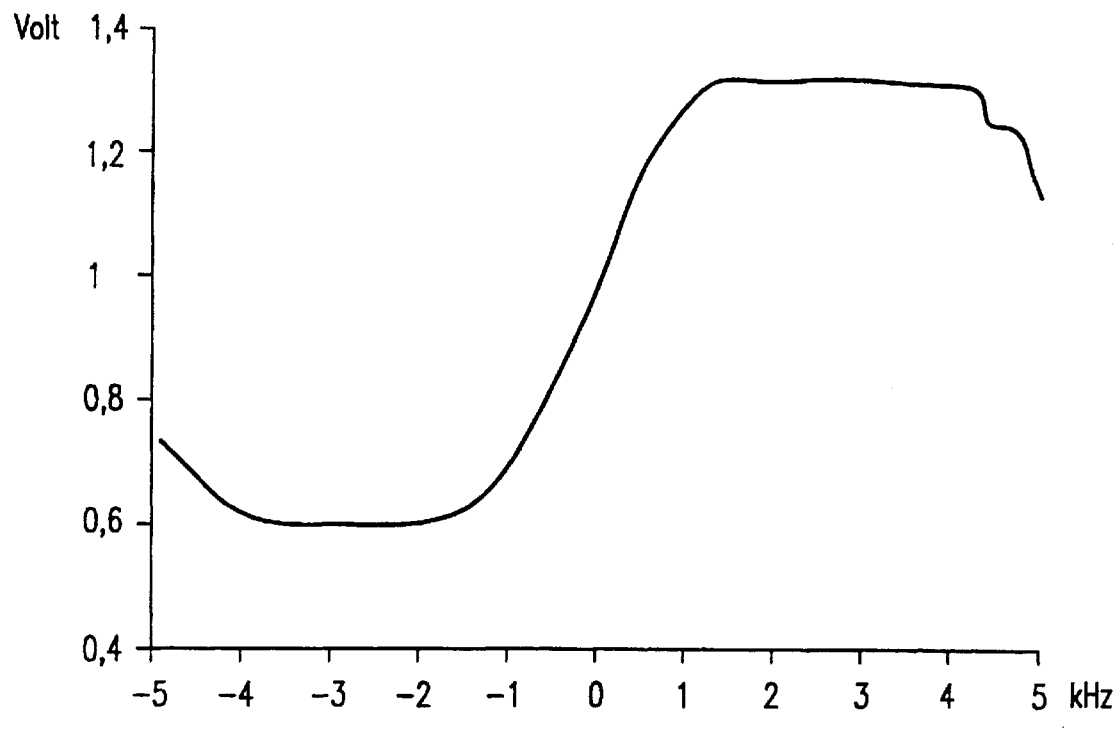
FIGS. 5 and 6 show examples of measured frequency-voltage characteristics of a frequency control system for a controllable oscillator in a circuit arrangement according to the invention.
Figure 6:
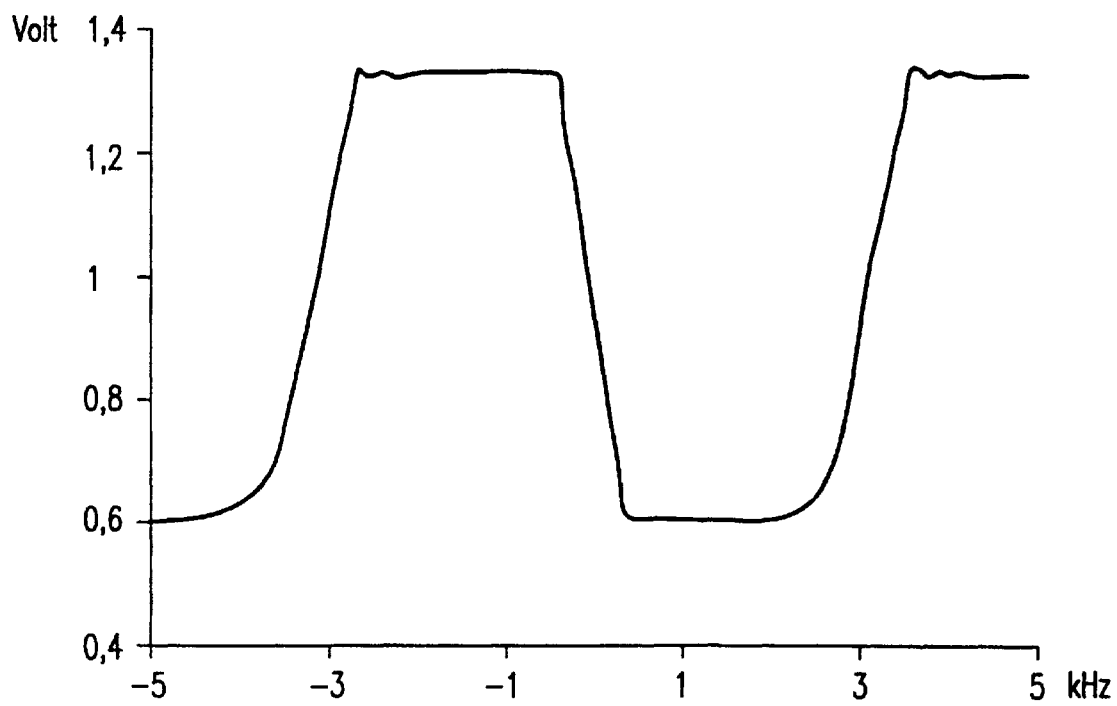

For an example concerning the proportioning of the circuit arrangement according to the invention the FIGS. 5 and 6 show the functional relationship between the deviation of the frequency of the oscillator from the carrier frequency of the transmitter and the value of the control signal generated by the circuit arrangement according to the invention. To this end, the control signal is plotted on the ordinate as a voltage at the output 25 of the RC low-pass filter 24. FIG. 5 shows the relationship for a modulated input signal, and FIG. 6 shows the comparable case for a non-modulated input signal.

The integration stage 21 can be implemented with a programmable circuit arrangement, if desired, in which the signal processing steps of the integration stage are executed during a programmed signal processing routine.

What is claimed is:

1. A circuit arrangement for generating a control signal for a controllable oscillator of a receiving device, said circuit arrangement being arranged to mix an FSK modulated input signal having at least two predetermined input frequencies with an oscillation supplied by the controllable oscillator, thus forming an intermediate frequency signal, as well as to derive from the intermediate frequency signal a data signal whose value follows from the frequency of the intermediate frequency signal (intermediate frequency), and to derive also a demodulator pulse signal whose frequency or phase is a measure of the frequency or the phase of the intermediate frequency signal, said circuit arrangement comprising a control signal generating branch for deriving the control signal from the demodulator pulse signal, an interrupt signal generating branch for deriving an interrupt signal from the data signal during the time intervals in which the data signal changes its value, as well as an interrupt stage which suppresses the extraction of a value for the control signal from the demodulator pulse signal in response to the appearance of the interrupt signal.

2. A circuit arrangement for generating a control signal for a controllable oscillator of a receiving device, said circuit arrangement being arranged to mix an FSK modulated input signal having at least two predetermined input frequencies with an oscillation supplied by the controllable oscillator, thus forming an intermediate frequency signal, as well as to derive from the intermediate frequency signal a data signal whose instantaneous value follows from the frequency of the intermediate frequency signal (intermediate frequency), and to derive also a demodulator pulse signal whose frequency or phase is a measure of the frequency or the phase of the intermediate frequency signal, said circuit arrangement comprising a control signal generating branch for deriving the control signal from the demodulator pulse signal, an interrupt signal generating branch for deriving an interrupt signal from the data signal during the time intervals in which the data signal changes its value, as well as an interrupt stage which suppresses the extraction of a value for the control signal from the demodulator pulse signal in response to the appearance of the interrupt signal, wherein the control signal is formed by temporal averaging of a sequence of control signal values discontinuously derived from the demodulator pulse signal, control signal values stemming from the time intervals in which the data signal changes its value being precluded from the averaging operation.

3. A circuit arrangement as claimed in claim 2, wherein the demodulator pulse signal contains a sequence of pulses whose repetition frequency is an integer multiple of the intermediate frequency, the control signal values being formed by measurement of the temporal distance between successive pulses.

4. A circuit arrangement as claimed in claim 3, further comprising an integration stage for forming a respective one of the control signal values by integration of a signal having a constant level in a respective one of the time intervals between each time two successive pulses of the demodulator pulse signal.

5. A circuit arrangement as claimed in claim 1, wherein the interrupt signal generating branch comprises:

a signal transition detection stage for detecting the transitions of the value of the data signal, and a pulse-shaping stage which is coupled to the signal transition detection stage in order to form a pulse-shaped interrupt signal which covers the time interval in which the data signal changes its value.

6. A circuit arrangement for generating a control signal for a controllable oscillator of a receiving device, said circuit arrangement being arranged to mix an FSK modulated input signal having at least two predetermined input frequencies with an oscillation supplied by the controllable oscillator, thus forming an intermediate frequency signal, as well as to derive from the intermediate frequency signal a data signal whose instantaneous value follows from the frequency of the intermediate frequency signal (intermediate frequency), and to derive also a demodulator pulse signal whose frequency or phase is a measure of the frequency or the phase of the intermediate frequency signal, said circuit arrangement comprising a control signal generating branch for deriving the control signal from the demodulator pulse signal, an interrupt signal generating branch for deriving an interrupt signal from the data signal during the time intervals in which the data signal changes its value, as well as an interrupt stage which suppresses the extraction of a value for the control signal from the demodulator pulse signal in response to the appearance of the interrupt signal, wherein the interrupt signal generating branch comprises:

a signal transition detection stage for detecting the transitions of the value of the data signal, and a pulse-shaping stage which is coupled to the signal transition detection stage in order to form a pulse-shaped interrupt signal which covers the time interval in which the data signal changes its value, and the signal transition detection stage includes a differentiation stage and a subsequent rectifier stage.

7. A radio receiver which includes a circuit arrangement as claimed in claim 1.

8. A circuit arrangement as claimed in claim 2, wherein the interrupt signal generating branch comprises:

a signal transition detection stage for detecting the transitions of the value of the data signal, and a pulse-shaping stage which is coupled to the signal transition detection stage in order to form a pulse-shaped interrupt signal which covers the time interval in which the data signal changes its value.

9. A circuit arrangement as claimed in claim 3, wherein the interrupt signal generating branch comprises:

a signal transition detection stage for detecting the transitions of the value of the data signal, and a pulse-shaping stage which is coupled to the signal transition detection stage in order to form a pulse-shaped interrupt signal which covers the time interval in which the data signal changes its value.

10. A circuit arrangement as claimed in claim 4, wherein the interrupt signal generating branch comprises:

a signal transition detection stage for detecting the transitions of the value of the data signal, and a pulse-shaping stage which is coupled to the signal transition detection stage in order to form a pulse-shaped interrupt signal which covers the time interval in which the data signal changes its value.

* * * * *